United States Patent [19]
Billard et al.

[11] Patent Number: 4,926,259
[45] Date of Patent: May 15, 1990

[54] IMAGE PROCESSING SYSTEM

[75] Inventors: Didier Billard, Vitry-sur-Seine; Bernard Poquillon, Paris, both of France

[73] Assignee: U.S. Philips Corporation, New York, N.Y.

[21] Appl. No.: 401,700

[22] Filed: Aug. 31, 1989

[30] Foreign Application Priority Data

Sep. 13, 1988 [FR] France ................. 88 11913

[51] Int. Cl.$^5$ .................................. H04N 7/18
[52] U.S. Cl. .......................... 358/105; 358/93
[58] Field of Search ............ 358/105, 106, 107, 93, 358/108

[56] References Cited

U.S. PATENT DOCUMENTS 4,592,089  5/1986  Hartman .............. 358/107
4,755,874  7/1988  Esrig ................... 358/106

Primary Examiner—Howard W. Britton
Attorney, Agent, or Firm—Michael E. Marion

[57] ABSTRACT

Image processing system for the acquisition and processing of video signals corresponding to a plurality of images. The system provides space-time filtration of similar behavior in the images in both the space direction and the time direction.

4 Claims, 1 Drawing Sheet

IMAGE PROCESSING SYSTEM

BACKGROUND OF THE INVENTION

The present invention relates to an image processing system comprising means for the acquisition of video signals corresponding to the images in question, and means for processing these acquired signals.

For several years most image processing processes and apparatus were dedicated to the analysis of static scenes, because the majority of the applications envisaged did not take time information into account. The increase in the computational power of data processing hardware has, however, progressively made it possible to envisage the real time processing of image sequences, particularly in applications such as artificial vision, monitoring systems, the detection of movement with the extraction of mobile objects from the scene, or else for the purpose of achieving better image quality by reducing the noise affecting the image sequences.

Considerable efforts have also been made to solve the problem inherent in the processing of dynamic images. The numerous psychovisual experiments carried out in connection with movement perception by the human visual system will not be described here. It will simply be recalled that as the result of such experiments it would appear that human visual system can distinguish the relative movement of two regions consisting of random distributions of grey levels, provided that the succession of the images is sufficiently rapid in relation to the amplitude of the movement (see D. H. Ballard and Ch. M. Brown, "Computer Vision", Prentice-Hall Inc., 1982). This finding indicates that the movement is detected at the level of the image itself and not exclusively through the medium of a symbolic representation of the scene observed.

Movement detection at image level is generally effected in accordance with one of the three approaches described in T. Z. Young and K. S. Fu, "Handbook of pattern recognition and image processing", Academic Press, 1986. It may first be attempted to bring into correspondence physical points in the scene and to estimate the displacement of the camera between successive images. This approach leads to an extremely complex system of non-linear equations containing N unknowns, and also makes use of a considerable number of restrictive hypotheses. Another, simpler method utilizes the notion of an optical stream defined by the instantaneous speeds at each point X, Y of the image taken at a given moment. In this case therefore, the only concern is the projection of the threedimensional movements of the objects onto a particular plane, namely the plane of the image, and this method likewise makes use of a certain number of restrictive hypotheses indispensable for the estimation of a range of speeds, such as limited maximum velocity, spatial coherence of the range of instantaneous speeds, and so on. Finally, it is possible to operate in accordance with a third approach providing detection and estimation of movement by space-time filtrations.

Movement detection by space-time filtration is particularly interesting for the following reasons. On the one hand, it is based on psychovisual experiments which indicate that the perception of the movement by the human visual system makes use of mechanisms very similar from the formal viewpoint, and this similarity to the behaviour of organic visual systems is manifested, for example, in the case of apparent movements induced by dynamic visual illusions. In addition, the conventional space-time filters make it possible to obtain good selectivity with respect to the direction of the apparent movement detected, as well as with respect to the velocity of this apparent movement (to a lesser extent, however, because the sensitivity of man to a variation of speed is less than his sensitivity to a variation of direction). Finally, these filters permit the detection of local movements, that is to say different movements at different points of the image, in contrast to methods which seek an estimation of a global parametric movement of the scene observed.

Practically all known space-time filtration techniques agree in considering the sequence of images to be processed as a threedimensional signal $f(x, y, t)$. The space-time filter defined in this threedimensional space x, y, t, in order to make a filtered signal equal to $T(f(x, y, t))$ correspond to $f(x, y, t)$, must, in order to respect the local character rule, be entirely defined on a limited space-time support of this threedimensional space. At first sight this space would appear to be related to a conventional threedimensional space in which the objects are defined in respect of height, width and depth, but in the present case the time dimension assumes particular significance because of its inherent characteristics, particularly its irreversibility. Known space-time filters therefore often show close behaviour in x and y, associated with specific behaviour in respect of the time dimension.

The simplest space-time filtration (see for example A. P. Bernat et al., "Security applications of computer motion detection", SPIE Vol. 786, Applications of Artificial Intelligence V, 1987, p. 512–517) consists in effecting a point-to-point difference between two successive images: if two corresponding points do not have the same luminance, this difference is not zero and indicates an apparatus movement. This technique, which is sensitive to noise, can be improved by effecting median filtration or a spatial mean of the grey levels before calculating the difference between successive images. Filters produced in accordance with this technique certainly meet the condition of local character, but no selectivity is obtained in the direction of the movement or its velocity, and their rather mediocre performance can be improved only with the aid of techniques which are no longer within the field of space-time filtration properly speaking.

An improved space-time filtration technique consists in making use of the known properties of linear filters and their Fourier transforms. At the cost of special processing, such as the estimation of the space-time energy of the movement, measured by the sum of the squares of two responses of linear filters in phase quadrature, or this same estimation for the energy in phase opposition by replacing the quadratic sum by a difference in the responses of two filters in phase quadrature, it is then possible to obtain filters sensitive to the direction of the movement and/or to the direction of the displacement. The use of batteries of filters finally makes it possible to estimate both the direction and the velocity of the local displacement.

The paper by S. Beucher, J. M. Blosseville and F. Lenoir, given in November 1987 at SPIE Cambridge Symposium on Advances in Intelligent Robotics Systems, entitled "Traffic spatial measurements using video image processing: application of mathematics morphology to vehicles detection", makes use of another type of filtration, morphological filtration, for the automatic measurement of vehicle flow. This morphological filtration, however, relates only to a twodimensional image reconstructed from a mean of differences between successive images of the traffic image sequence. Here again, as with the previous filters described, there is thus a behavior of a certain type in the spatial plane of the image and a specific behavior in respect of the time direction.

SUMMARY OF THE INVENTION

One aim of the invention is to provide an image sequence processing apparatus providing, in a novel manner, a space-time filtration of similar behavior in both the space direction and the time direction.

To this end, the invention relates to an image processing system characterized in that the processing means in question themselves comprise:

(a) movement estimation stage;
(b) a morphological filtration stage;
(c) a storage and/or visual display stage;

said morphological filtration stage itself including a circuit for the definition of a space-time structuring element from movement parameters estimated by the movement estimation stage, and a morphological filtration circuit.

In an improved variant embodiment the invention also relates to a system characterized in that the movement estimation stage is preceded by an image readjustment circuit, a circuit determining differences between images, and a threshold circuit, all three connected in series.

The features and advantages of the invention will now appear more precisely from the following description and from the accompanying drawings, which are given as non-limiting examples and in FIG. 1 shows a first embodiment of an image processing system according to the invention.

FIG. 2 shows a second embodiment of an image processing system according to the invention.

DETAILED DESCRIPTION OF EMBODIMENTS OF THE INVENTION

Figures 1, 2:
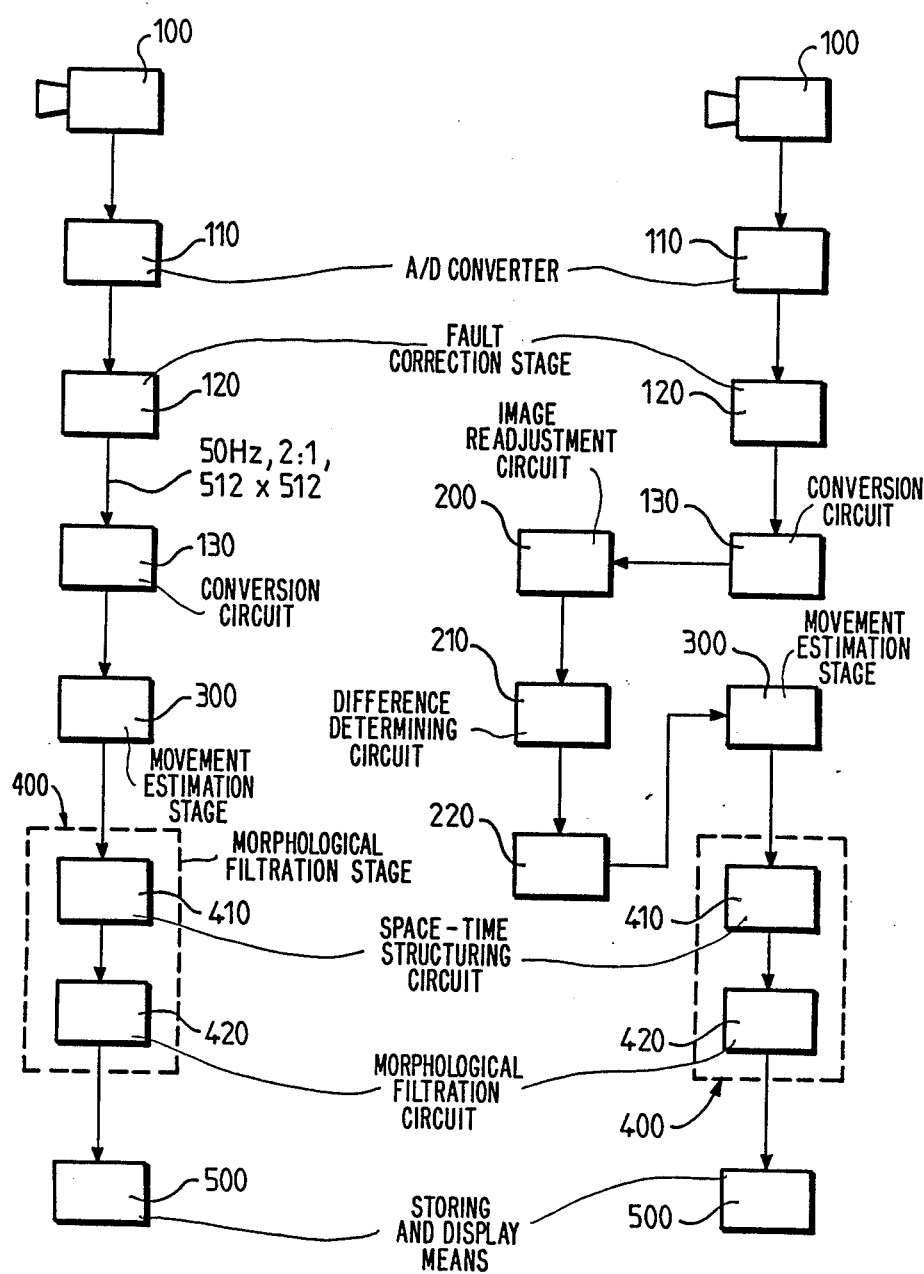

An image processing system generally comprises image acquisition means, such as a camera, and then optionally means for the correction of faults specific to these acquisition means. It is in fact most usually necessary to reduce the electronic noise coming from the image acquisition part (more precisely the noise coming from the detectors, the amplifier circuits and the digitization circuits, because the analog output signals from the camera are generally transmitted to an analog/digital converter for the purpose of processing in digital form), and also to reduce the faults inherent in the camera (distortions, differences in response of detectors, and so on).

These means for the correction of faults in the camera or in the circuits immediately associated with it are now classic and will not be described in detail. It will simply be mentioned that they permit an improvement in the detection performance and in the quality of the images obtained in comparison with the original images, and that these improvements contribute towards enhancing the performance of subsequent processing.

FIG. 1 shows an example of embodiment of an image processing system comprising in succession a camera 100, an analog/digital converter 110, and a fault correction stage 120 effecting, as indicated above, the reduction of the noise and of the faults inherent in the camera and its associated electronic circuits. In the example described here it will be assumed that the sequence of images at the output of stage 120 is a sequence of 25 interlaced images per second, of the format 512 dots×512 dots, which in the remainder of the description and in FIG. 1 will be indicated as follows:

50 Hz, 2:1, 512×512, the image dots being in addition coded with the aid of $2^8 = 256$ grey levels.

This 50 Hz, 2:1, 512×512 sequence of images is first fed to a circuit 130 for conversion of interlaced format into sequential format, and then to a movement estimation stage 300 of known type. This estimation of movement can for example be effected by first estimating the total rotation of the image by extraction of contours and detection of the correlation peak between histograms of the directions of these contours (see the following document: Compiégne University Thesis of Eva Salmeron, "Mise en coincidence automatique des contours extraits d'images aériennes et d'éléments carthographiques", 1986). The estimation of the rotation is then followed by the calculation of the total translation, which can be made by applying the phase correlation plane method after compensation of the rotation previously estimated (see "The Phase Correlation Image Alignment Method", C. D. Kuglin & D. C. Hines, IEEE Int. Conf. on Cybernetics and Society, San Francisco, 1975, Sept. 23-25). The stage 300 thus makes it possible to determine the movement of the image background.

The stage 300 is followed by a morphological filtration stage 400, which comprises a circuit 410 defining a space-time structuring element with respect to the movement parameters estimated by the stage 300, and then a morphological filtration circuit 420.

Some notions in respect of mathematical morphology will be recalled here. The morphological approach consists in considering an image as a set on which operators will be brought to act. For this purpose, what may be called structuring elements are defined, namely given geometrical shapes located by the position of their centre. By bringing this centre into coincidence with the points of a set it is possible to define particular operators (erosion, expansion, and so on), as indicated below, the space considered being, in the present case of application to images, the graph of the "grey level" function of these images. The language of mathematical morphology is thus that of the theory of sets. In this sense, a morphological filtration is a nonlinear conversion of a signal, which locally modifies the geometrical characteristics of this signal. In the case of a binary, two-dimensional image the signal is equivalent to the datum of the set of level 1 points (=objects) and of that of the level 0 points (=background). Effecting a morphological filtration on this image consists in analyzing the interaction between the set S of the objects with a compact set B which is given a priori and which is the structuring element. It is the element that defines the filtration to be effected by means of Minkowski operations on the sets. It may be recalled here that the Minkowski addition and subtraction of two sets A and B are defined by the relations (1) and (2). By defining the symmetric of B, designated B', by relation (3), it is possible to propose two dual morphological filters, the erosion of X by B (relation (4)) and the expansion of X by B (relation (5)). It will be noted that the product of erosion of X by B coincides with the set of the points z of the image for which the structuring element centered at z and designated $B_z$ is entirely included in X. Similarly, the product of the expansion of X by B corresponds to the points z of the image for which $B_z$ intersects the set X. The two basic conversions, erosion and expansion by B, are not the inverse of one another and their succession defines two new filters, which are the opening of X by B, defined by relation (6), and the closing of X by B, defined by relation (7).

As has been seen above, the morphological filters have been applied above all to the analysis of static twodimensional images, and not to space-time signals. In the present application the structuring element here constitutes in fact the limited support B of the space-time domain on which the filtrations to be effected are defined (that is to say, B is defined as the set of the points $(x_o, y_o, t_o)$ of the space-time domain on which the elementary filtrations, such as erosions and expansions, will be effected). The time sections Bs $(x_o, y_o) = B(x_o, y_o, 0)$ passing through the origin of the space $(x, y, t)$ being fixed arbitrarily (for example as a disc of a given radius R), the other sections will be deduced therefrom by the formulae (8) and (9) given in the appendix, where $\theta$, tx, ty are the parameters, estimated by the stage 300, of the movement between the moment of time t and the moment of time $t+t_o$. The time extension $[t_1, t_2]$ of this structuring element $B(x_o, y_o, t_o)$ is fixed arbitrarily as a function of the degree of smoothing selected, but in any case the support must be limited both in space and in time.

Once the structuring element B has been defined, a circuit 420 makes the corresponding morphological filtrations. For the purpose of reducing noise by time filtration, taking into account the relative movement between two images, an opening or a closing will preferably be effected, or else a succession of these two filtrations in order to obtain an opening-closing (that is to say an opening followed by a closing) or a closing-opening (that is to say a closing followed by an opening). Each of these conversions breaks down into a succession of the two elementary space-time operations, erosion and expansion.

The space-time erosion concerned here is defined by the expression (10) and the space-time expansion by the expression (11), these expressions being, as previously, given in the appendix. In these expressions, $f(x, y, t)$ is the grey value of the image at the point $(x, y)$ and at the moment of time t. The opening is then achieved by effecting an erosion followed by an expansion, and closing by the sequence comprising an expansion and an erosion (it should be noted that the extraction of the minimum or maximum of the grey value of the sequence of images on the structuring element $B(x_o, y_o, t_o)$ can be broken down into a succession of three successive extractions of a minimum or maximum in each of the dimensions x, y or t, in any order).

The stage 400 is in turn followed by a stage 500 which finally permits the storing andl/or visual display of the filtered images.

In a variant embodiment of the system thus described, this space-time filtration leading to an improvement of the quality of the images obtained can be supplemented by better detection of the principal mobile objects relative to the background which appear on these images. FIG. 2, which illustrates a variant embodiment of this kind, comprises on the one hand the same elements as in FIG. 1, which ae therefore given the same references, and on the other hand, between the format conversion circuit 130 and the movement estimation stage 300, three additional circuits in series, which are as follows.

The series of sequential output images of the circuit 130 is first fed to an image readjustment circuit 200 intended to compensate the movement of the background on the sequence, in order to obtain at the output of this stage a sequence of images with a fixed background. An example of the readjustment technique consists in making an estimation of the parameters of the total movement between successive images by bringing windows of one image and the next into correspondence, then calculating the total geometrical conversion by smallest square estimation on the displacement vectors thus extracted (see the document "Detection of moving vehicles in thermal imagery obtained froma moving platform", Arthur V. Forman et al., SPIE, vol. 432, Applications of Digital Image Processing VI, p. 136-147). This circuit is followed by a circuit 210 determining differences between images, which supplies a sequence of images on which appear only the parts which are mobile relative to the background of the scene (the fixed parts being eliminated and set to zero level), with in addition the noise coming from the preceding acquisition and processing stages. A threshold circuit 220 then makes it possible to make a selection on these signals, finally producing a sequence of binary images on which the image points belonging to the sequence of successive image differences are set at 1 if their grey value on these images is different from zero (these image points thus corresponding to the mobile parts of the sequence but also to residual noise). The output of the threshold circuit 220 is supplied to the movement estimation stage 300, which is used this time to supply the parameters of the different translations $t_x$, $t_y$ between two successive images of the mobile objects of the preceding binary sequence, which can for example be achieved by applying the previously described phase correlation plane technique.

The present invention is obviously not limited to the examples of embodiment described above and illustrated, on the basis of which variants can be proposed without thereby going beyond the scope of the invention. In particular, the format conversion circuit 130 will be omitted when the succession of images to be supplied to the movement estimation stage 300 is already in sequential form.

Appendix (1) $A \oplus B = (a+b \mid a \, \delta A \text{ and } b \, \delta B)$
(2) $A \ominus B = (a-b) \mid a \, \delta A \text{ and } b \, \delta B)$
(3) $B' = (-b \mid b \, \delta B)$
(4) Erosion of X by $B = X \ominus B'$
(5) Expansion of X by $B = X \oplus B'$
(6) Opening of X by $B = (X)_B$ with $(X)_B = (X \ominus B') \oplus B$
(7) Closing of X by $B = (X)^B$ with $(X)^B = (X \oplus B') \ominus B$
(8) $B(x_o, y_o, t_o) = B(f_x(x_o, y_o), f_y(x_o, y_o, 0)$ $$(9) \quad \begin{vmatrix} f_x(x_o, y_o) \\ f_y(x_o, y_o) \end{vmatrix} = \begin{vmatrix} \cos\theta & -\sin\theta \\ \sin\theta & \cos(\theta) \end{vmatrix} \cdot \begin{vmatrix} x_o \\ y_o \end{vmatrix} + \begin{vmatrix} t_x \\ t_y \end{vmatrix}$$

(10) $(f-B)(x, y, t) = \text{Min} (f(x+x_o, y+y_o, t+t_o))$ (for $x_o$, $y_o$, $t_o$ belonging to B)
(11) $(f+B)(x, y, t,) = \text{Max} (f(x+x_o, y+y_o, t+t_o))$ (for $x_o$, $y_o$, $t_o$ belonging to B)

We claim:

1. An image processing system comprising means for the acquisition of video signals corresponding to a plurality of images, and means for processing these acquired signals, wherein said processing means comprise:
(a) a movement estimation stage;
(b) a morphological filtration stage;
(c) a storage and/or visual display stage; said morphological filtration stage itself including a circuit for the definition of a space-time structuring element from movement parameters estimated by the movement estimation stage, and a morphological filtration circuit.

2. The system according to claim 1, the movement estimation stage is preceded by a circuit for the conversion of interlaced format into sequential format.

3. The system according to claim 1 wherein, the movement estimation stage is preceded by an image readjustment circuit, a circuit determining differences between images, and a threshold circuit, all three connected in series.

4. The system according to claim 2 wherein, the movement estimation stage is preceded by an image readjustment circuit, a circuit determining differences between images, and a threshold circuit, all three connected in series.

* * * * *